US009249915B2

(12) United States Patent
Rogers

(10) Patent No.: US 9,249,915 B2
(45) Date of Patent: Feb. 2, 2016

(54) PUMP PULSATION DISCHARGE DAMPENER WITH DUAL PRESSURE DROP TUBE ASSEMBLIES HAVING UNEQUAL SIZES

(75) Inventor: John Thomas Rogers, Garland, TX (US)

(73) Assignee: PERFORMANCE PULSATION CONTROL, INC., Richardson, TX (US)

( * ) Notice: Subject to any disclaimer, the term of this patent is extended or adjusted under 35 U.S.C. 154(b) by 940 days.

(21) Appl. No.: 13/355,277

(22) Filed: Jan. 20, 2012

(65) Prior Publication Data

US 2012/0189477 A1 Jul. 26, 2012

Related U.S. Application Data

(60) Provisional application No. 61/434,679, filed on Jan. 20, 2011.

(51) Int. Cl.
| | | |
|---|---|---|
| *F16L 55/04* | (2006.01) | |
| *F16L 55/027* | (2006.01) | |
| *F04B 39/00* | (2006.01) | |
| *F04B 11/00* | (2006.01) | |
| *F04B 53/00* | (2006.01) | |

(52) U.S. Cl.
CPC ........... *F16L 55/027* (2013.01); *F04B 11/0091* (2013.01); *F04B 39/0055* (2013.01); *F04B 39/0072* (2013.01); *F04B 53/001* (2013.01); *F16L 55/02718* (2013.01); *F16L 55/02754* (2013.01); *F16L 55/04* (2013.01); *Y10T 137/3118* (2015.04); *Y10T 137/86043* (2015.04); *Y10T 137/86348* (2015.04); *Y10T 137/86381* (2015.04)

(58) Field of Classification Search
CPC ............. F16L 55/041; F16L 55/02754; F16L 55/02763; F16L 55/04; F16L 55/043; F16L 55/05; F16L 55/02718; F16L 55/027; F04B 39/0072; F04B 39/0038; F04B 39/0055; F04B 11/0091; Y10T 137/86348; Y10T 137/86043; Y10T 137/86381; Y10T 137/3118
USPC ............. 137/590, 593, 565.34, 207; 417/542, 417/543, 312; 138/26, 40, 42, 44
See application file for complete search history.

(56) References Cited

U.S. PATENT DOCUMENTS

| | | | | | |
|---|---|---|---|---|---|
| 2,993,559 | A | * | 7/1961 | Everett ........................... | 181/268 |
| 5,307,782 | A | * | 5/1994 | Davis ............................. | 123/510 |
| 5,372,116 | A | | 12/1994 | Davis | |
| 5,752,486 | A | * | 5/1998 | Nakashima et al. .......... | 123/467 |
| 5,860,799 | A | | 1/1999 | Scheibe et al. | |
| 2003/0151978 | A1 | | 8/2003 | Jeffryes et al. | |
| 2004/0139945 | A1 | * | 7/2004 | Kondo ........................... | 123/456 |

OTHER PUBLICATIONS

Notification of Transmittal of the International Search Report and the Written Opinion of the International Searching Authority, or the Declaration dated Apr. 24, 2012 in connection with International Patent Application No. PCT/US2012/022075.

* cited by examiner

*Primary Examiner* — Atif Chaudry

(57) ABSTRACT

Different inner diameter internal or external pressure drop tubes or orifice plate openings producing different discharge pressure pulse amplitudes are employed in a pump pulsation control reactive discharge dampener. Either both pressure drop tubes/orifice plates may be mounted concurrently on or in the dampener, connected to different discharge pipes used selectively by the operator depending upon the piston or plunger size being employed, or the pressure drop tubes/ orifice plates may be interchangeable.

20 Claims, 12 Drawing Sheets

PUMP PULSATION DISCHARGE DAMPENER WITH DUAL PRESSURE DROP TUBE ASSEMBLIES HAVING UNEQUAL SIZES

CROSS-REFERENCE TO RELATED APPLICATIONS

This application claims priority to U.S. Provisional Patent Application Ser. No. 61/434,679 entitled PUMP PULSATION DISCHARGE DAMPENER WITH DUAL PRESSURE DROP TUBE ASSEMBLIES HAVING UNEQUAL SIZES and filed on Jan. 20, 2011. The content of the above-identified patent documents is hereby incorporated by reference.

TECHNICAL FIELD

The present application relates generally to the operation of reciprocating systems and, more specifically, to providing a pump discharge pulsation dampener with dual outlets in such reciprocating systems.

BACKGROUND

Reciprocating systems, such as reciprocating pump systems and similar equipment, operate in many types of cyclic hydraulic applications. For example, reciprocating mud pump systems are used to circulate the mud or drilling fluid on a drilling rig. Pressure peaks accelerate the deterioration of the pump, the pump's fluid end expendable parts, and equipment downstream from the pump with each subsequent pulsation. Failure to control such pressure peaks and inevitably affect the operating performance and operational life of the pump, pump fluid end expendable parts and all downstream components.

Pulsation dampeners are typically placed immediately downstream from a reciprocating pump, often with a relative size and configuration proportional to the volume of desired fluid displacement per stroke of the pump and the maximum allotted magnitude of the pressure peaks experienced by the pump system during each pulsation. Pulsation dampeners thus aid in reducing pump loads and minimizing pulsation amplitudes to the pump, the pump's fluid end expendable parts and to equipment downstream. As a result, pulsation dampeners increase the relative operating performance and life of the pump, the pump's fluid end expendable parts and any equipment downstream from the pump.

One type of a conventional pump discharge dampener includes an output tube that is located in the pump dampener outlet. This outlet tube passes from the interior of the pump dampener to the pump dampener outlet. All fluid flow passes through this outlet tube, also known variously as the "pressure drop tube", "pressure drop tube assembly", "choke tube", "choker tube", and other names. Typically, the outlet tube is a single passage tube, which may be either internal or external to a cavity. In essentially equivalent structures, orifice plates are used in lieu of tubes.

There is, therefore, a need in the art for an improved pump discharge dampener to increase performance and pump life.

SUMMARY

Different inner diameter internal or external pressure drop tubes or orifice plate openings producing different discharge pressure pulse amplitudes are employed in a pump pulsation control reactive discharge dampener. Either both pressure drop tubes/orifice plates may be mounted concurrently on or in the dampener, connected to different discharge pipes used selectively by the operator depending upon the piston or plunger size being employed, or the pressure drop tubes/orifice plates may be interchangeable.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged pump discharge dampener that has an inlet and outlet and uses an outlet tube, pressure drop tube (internal or external) or orifice plate to control or partially control pulsation amplitudes.

Figure 1:
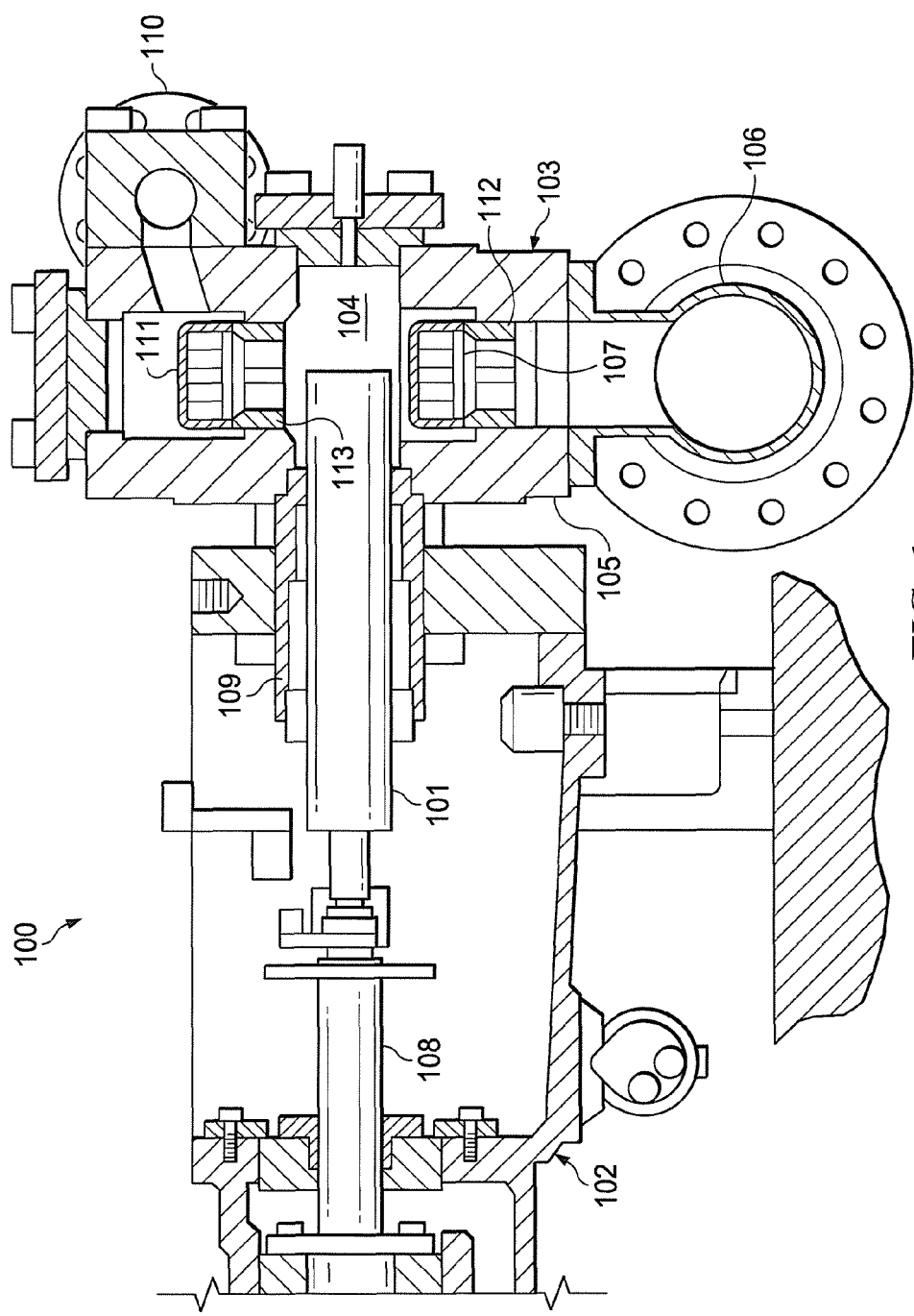
FIG. 1 is a cross sectional, somewhat simplified schematic view of a reciprocating pump system employed with a pump pulsation control reactive discharge dampener having two different pressure drop tubes according to an exemplary embodiment of the present disclosure.

FIG. 1 is a cross sectional, somewhat simplified schematic view of a reciprocating pump system employing a pump pulsation control reactive discharge dampener having two different pressure drop tubes according to an exemplary embodiment of the present disclosure. Pump system 100 may employ a reciprocating pump of a type well-known and commercially available. The pump within pump system 100 is configured to reciprocate one or more plungers or pistons 101 (only one shown in FIG. 1). Each piston or plunger is preferably connected by a suitable rotatable crankshaft or eccentric (not shown) mounted in a suitable "power end" housing 102. Power end housing 102 is connected to a fluid end structure 103 configured to have a separate pumping chamber 104 for each piston or plunger 101. Pumping chamber 104 is exposed to its respective piston or plunger 101. One such chamber 104 is shown in FIG. 1.

More specifically, FIG. 1 depicts a simplified cross-sectional view through a typical pumping chamber 104. Fluid end 103 includes housing 105. Pumping chamber 104 receives fluid from inlet manifold 106 by way of a conventional poppet type inlet or suction valve 107 (only one shown). Piston or plunger 101 projecting at one end into chamber 104 connects to a suitable crosshead mechanism, including crosshead extension member 108. Crosshead extension member 108 is operably connected to a crankshaft or eccentric (not shown) in a known manner. Piston or plunger 101 also projects through a conventional liner or through conventional packing 109, respectively. Each piston or plunger 101 is preferably configured to chamber 104. Each piston or plunger 101 is also operably connected to discharge piping manifold 110 by way of a suitable discharge valve 111, as shown. Discharge piping manifold 110 typically discharges into a discharge dampener (not shown in FIG. 1). Valves 107 and 111 are of conventional design and typically spring biased to their respective closed positions. Valves 107 and 111 each also include or are associated with removable valve seat members 112 and 113, respectively. Each of valves 107 and 111 may preferably have a seal member (not shown) formed thereon to provide fluid sealing when the valves are in their respective closed and seat engaging positions.

Those skilled in the art will recognize that the techniques of the present disclosure may be utilized with a wide variety of single and multi-cylinder reciprocating piston or plunger power pumps as well as possibly other types of positive displacement pumps. As in example, the number of cylinders of such pumps may vary substantially between a single cylinder and essentially any number of cylinders or separate pumping chambers. Those skilled in the art will also recognize that the complete structure and operation of a suitable pump system is not depicted or described herein. Instead, for simplicity and clarity, only so much of a pump system as is unique to the present disclosure or necessary for an understanding of the present disclosure is depicted and described.

Figure 2:
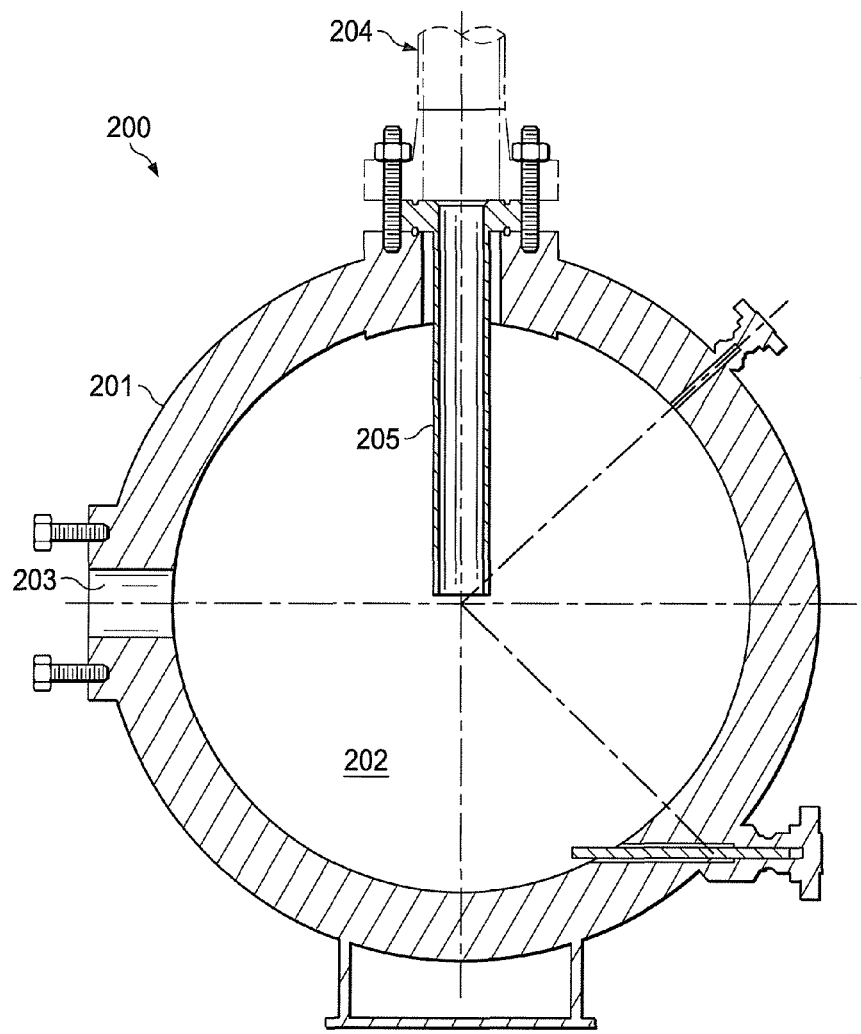
FIG. 2 is a somewhat simplified schematic view of one possible pump pulsation control reactive discharge dampener.

Conventional pump systems such as pump 100 shown in FIG. 1 typically include a discharge dampener system. FIG. 2 depicts one possible discharge dampener system 200. Discharge dampener system 200 has a body 201 with an interior surface forming a substantially annular interior chamber 202. Discharge dampener system 200 is typically secured to a solid surface, for example, a drill rig floor or pump skid. Discharge dampener system 200 receives and discharges "fluid" (which may be entirely liquid or which may include suspended solids—i.e., a slurry) into external discharge piping 201. Discharge dampener system 200 includes an inlet 203 that is coupled in fluid communication with the discharge manifold 110 of pump system 100 either directly or by intervening piping (not shown), allowing all pumped fluid to enter discharge dampener system 200, becoming temporarily part of the material filling internal volume of chamber 202. All fluid then exits through internal pressure drop tube assembly 205, which directs pumped fluid into an external discharge piping system 204. Pressure drop tube assembly 205 is a generally T-shaped structure with the wide end outside the body 201 of chamber 202 and the length extending through an orifice in the body 201 into the interior of chamber 202.

Fluid enters the internal end of pressure drop tube assembly 205 from cavity 202 and passes through pressure drop tube assembly 205, discharging into discharge piping system 204. The pressure drop tube creates a resistance or pressure drop as a result of the fluid entering and passing through the pressure drop tube, which has a smaller inner diameter than the inner diameter of discharge piping system 204. The pressure drop tube 205 dampens or lowers the pulsation amplitudes, and also reduces the higher frequency energies created by the pumping actions. As the flow rate changes, however, the pressure drop tube may in some cases become ineffective or even detrimental if the inner diameter is not properly sized or adjusted, prompting the techniques of the present disclosure.

Pumping systems may utilize different interchangeable pump pistons (or "plungers") having different displacements, generating different fluid flow rates and pressures, etc. For instance, mud pumps are continually increasing in horsepower and thus can operate with a wide range of piston sizes from 5" in diameter up through 9" in diameter. These piston or plunger size variations produce a wide range of flow rates and discharge pressures. Performance can be significantly improved if the pressure drop tubes are designed to handle narrower ranges of flow rates.

Figure 3:
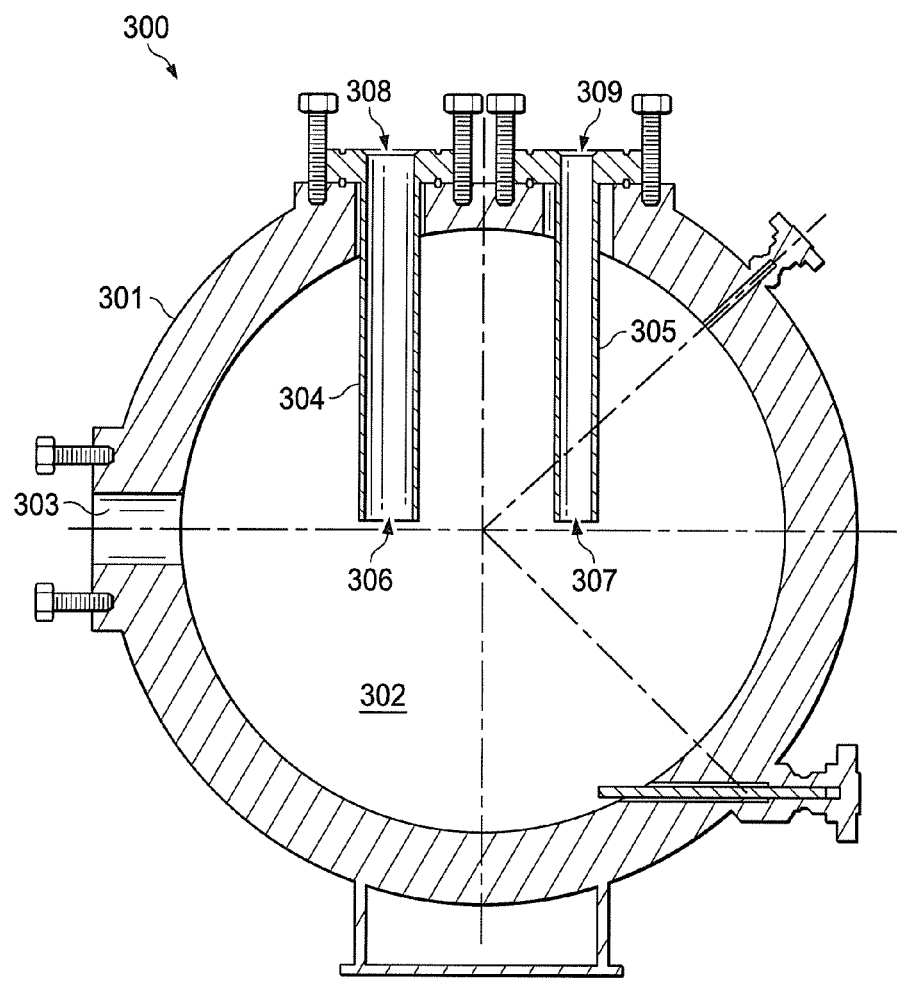
FIG. 3 is a somewhat simplified schematic view of a pump pulsation control reactive discharge dampener having two different internal pressure drop tubes according to an exemplary embodiment of the present disclosure.

FIG. 3 is a somewhat simplified schematic view of a pump pulsation control reactive discharge dampener having two different pressure drop tubes according to an exemplary embodiment of the present disclosure. Discharge dampener 300 has an annular body 301 forming an internal cavity 302 into which fluid from pump system 100 passes via inlet 303. Discharge dampener 300 includes dual pressure drop tubes 304 and 305 with respective inlets 306 and 307 internal to the discharge dampener body 301 and respective outlets 308 and 309 external to the discharge dampener body 301. Pressure drop tubes 304 and 305 have different inside diameters producing different pressure drops. High flow pressure drop tube 304 has an inner diameter that is larger than low flow pressure drop tube 305. This allows the operator to bring two independent discharge pipes (not shown in FIG. 3) to the two external outlet openings 308 and 309 for the two pressure drop tubes 304 and 305, and to switch between those two discharge pipes (i.e., sealing or closing one and employing the other to carry fluid) depending on the piston or plunger size being employed.

Figure 4:
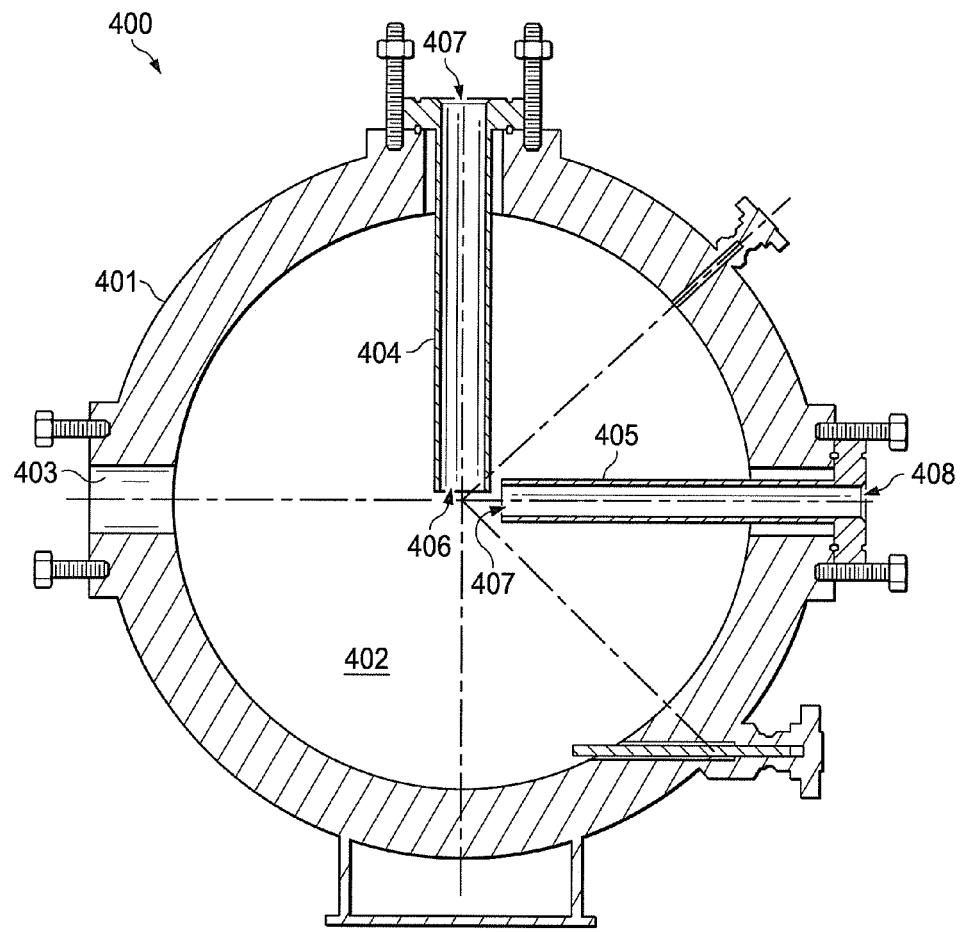
FIG. 4 is a somewhat simplified schematic view of a pump pulsation control reactive discharge dampener having two different internal pressure drop tubes according to another embodiment of the present disclosure.

FIG. 4 is a somewhat simplified schematic view of a pump pulsation control reactive discharge dampener having two different pressure drop tubes according to another embodiment of the present disclosure. Discharge dampener 400 again includes an annular body 401 forming an interior chamber 402 receiving fluid from pumping system 100 via inlet 403. Discharge dampener 400 also includes dual pressure drop tubes 404 and 405 with respective inlet openings 406 and 407 internal to the body 401 coupled by tubing to respective outlet openings 407 and 408 external to the body 401, and again having different inside diameters producing different pressure drops. Rather than being situated side-by-side with parallel orientation as in the embodiment of FIG. 3, however, pressure drop tubes 404 and 405 are spaced apart around a periphery of the annulus and oriented at an angle such as 90° (as depicted) or 45°, or other angles as may be needed.

Figure 5:
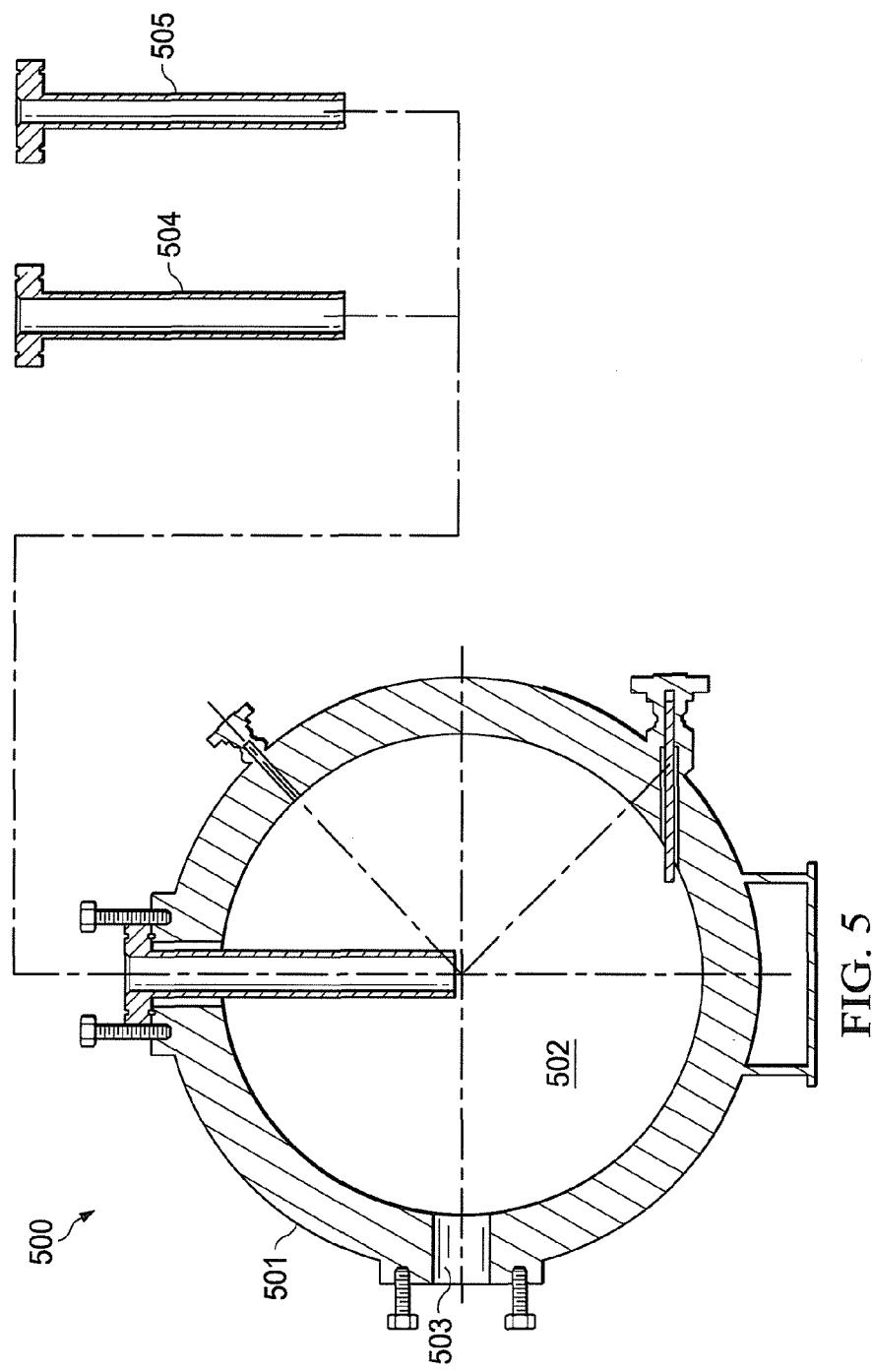
FIG. 5 is a somewhat simplified schematic view of a pump pulsation control reactive discharge dampener having interchangeable internal pressure drop tubes according to yet another embodiment of the present disclosure.

FIG. 5 is a somewhat simplified schematic view of a pump pulsation control reactive discharge dampener having interchangeable pressure drop tubes according to yet another embodiment of the present disclosure. Discharge dampener 500 includes an annular body 501 forming an interior chamber 502 fed by an inlet 503. In this embodiment, the body 501 has only one discharge opening receiving only one pressure drop tube at a time, either a large inner diameter pressure drop tube 504 or a small inner diameter pressure drop tube 505. Either tube, when mounted, is secured at the exterior of the outlet opening with the length extending into the interior of body 501.

FIGS. 6A through 6F are diagrams illustrating a pump pulsation control reactive discharge dampener having internal pressure drop tubes achieved by fitted sleeves with different internal diameters according to still another embodiment of the present disclosure. One improvement of the present disclosure is to employ a replaceable wear tip for any pressure drop tube assembly in reactive discharge dampeners. The inlet end of any of the pressure drop tubes 205, 304, 305, 404, 405, 504 or 505 may be fitted with an annular sleeve or end cap (described below and illustrated in FIGS. 6A through 6F) intended to be replaced after abrasion and wear have progressed to a predetermined point. Where different inner diameter pressure drop tubes are employed in the reactive dampener, each sleeves must naturally be sized to fit the particular pressure drop tube on which that sleeve will be used.

Figure 6A:
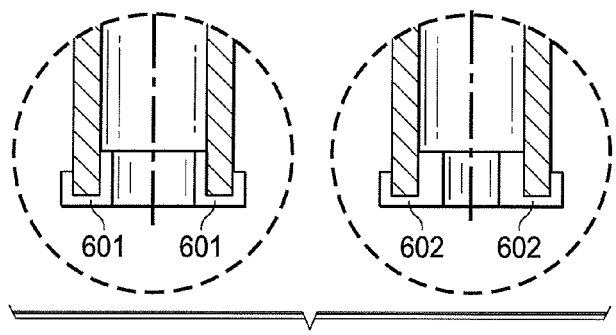
FIGS. 6A through 6F are diagrams illustrating a pump pulsation control reactive discharge dampener having internal pressure drop tubes achieved by fitted sleeves with different internal diameters according to still another embodiment of the present disclosure.

Notably, however, the pressure pulsation dampening provided by an internal pressure drop tube of the type illustrated in FIGS. 2 through 5 is achieved primarily based on the internal diameter of the inlet opening for the pressure drop tube. Accordingly, an annular sleeve of the type described above may alternatively be fitted over the end of the inlet for the pressure drop tube in a manner that modifies the internal diameter of the inlet opening. In this manner, the inner diameter of that opening may be adjusted based on the inner diameter of the sleeve. Illustrated in FIG. 6A are two pressure drop tubes of the same size having different sleeves 601 and 602 fitted over the inlet openings thereof, with different inner diameters to produce different flow characteristics. Thus, sleeves 601 are configured for use with a high flow rate while sleeves 602, producing a smaller inner diameter opening, are configured for use with a low flow rate. Alternatively, the same pressure drop tube may be fitted with different sleeves 601 and 602 at different times to effect the desired change. The sleeves are secured to the inlet ends of the internal pressure drop tubes in any suitable manner, as illustrated by sleeves 603 and 604 in FIG. 6B, which do not fit over both the inner and outer sides of the pressure drop tube but instead only overly the inner side and the end. Similarly, sleeves may be installed wholly internally in the pressure drop tube, as illustrated by sleeves 605, 606 and 607 in FIG. 6C. This allows the sleeves to be employed with external pressure drop tubes of the type described in connection with FIGS. 7 through 9. Various sleeve attachment methods and locations inside, encompassing, or outside the inlet end of a pressure drop tube are contemplated. IN addition, the pressure drop tubes themselves may differ depending on the configuration of the sleeves, as illustrated by optional low flow alternative sleeves 607 fitted to a pressure drop tube having an inner diameter (and thickness) that differs from the high flow rate variant 605.

Figure 6D:
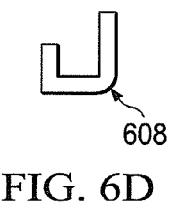
Figure 6B:
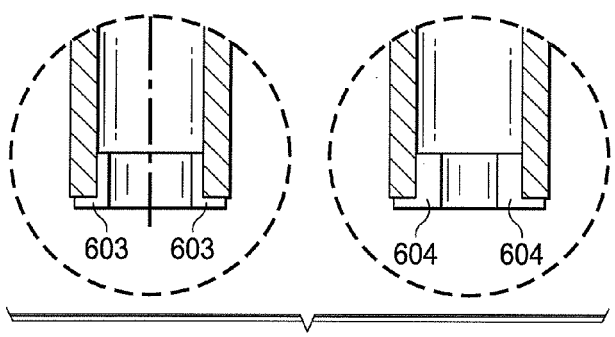
Figure 6E:
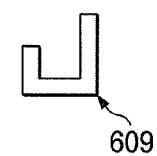
Figure 6F:
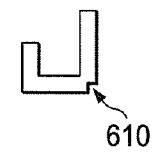
Figure 6C:
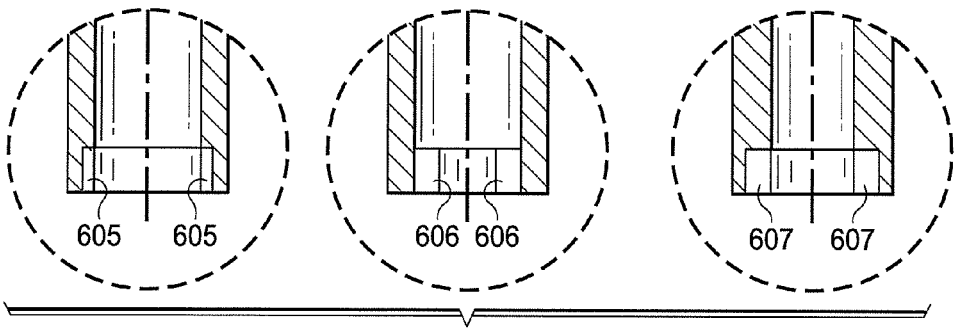

The shape of the inner corners of a pressure drop tube inlet can change fluid flow into and through the inlet, and therefore pressure pulsation damping performance. Accordingly, the inner corner or edge of the annulus for any of the sleeves 601 through 607 may be rounded 608, sharp (square) 609 or stepped 610 as depicted in FIGS. 6D through 6F. This can be done regardless of the internal diameter. Sleeves with different inner corner or annular edge profiles may be exchanged during operation to adjust pressure pulsation amplitude dampening performance.

Figure 7:
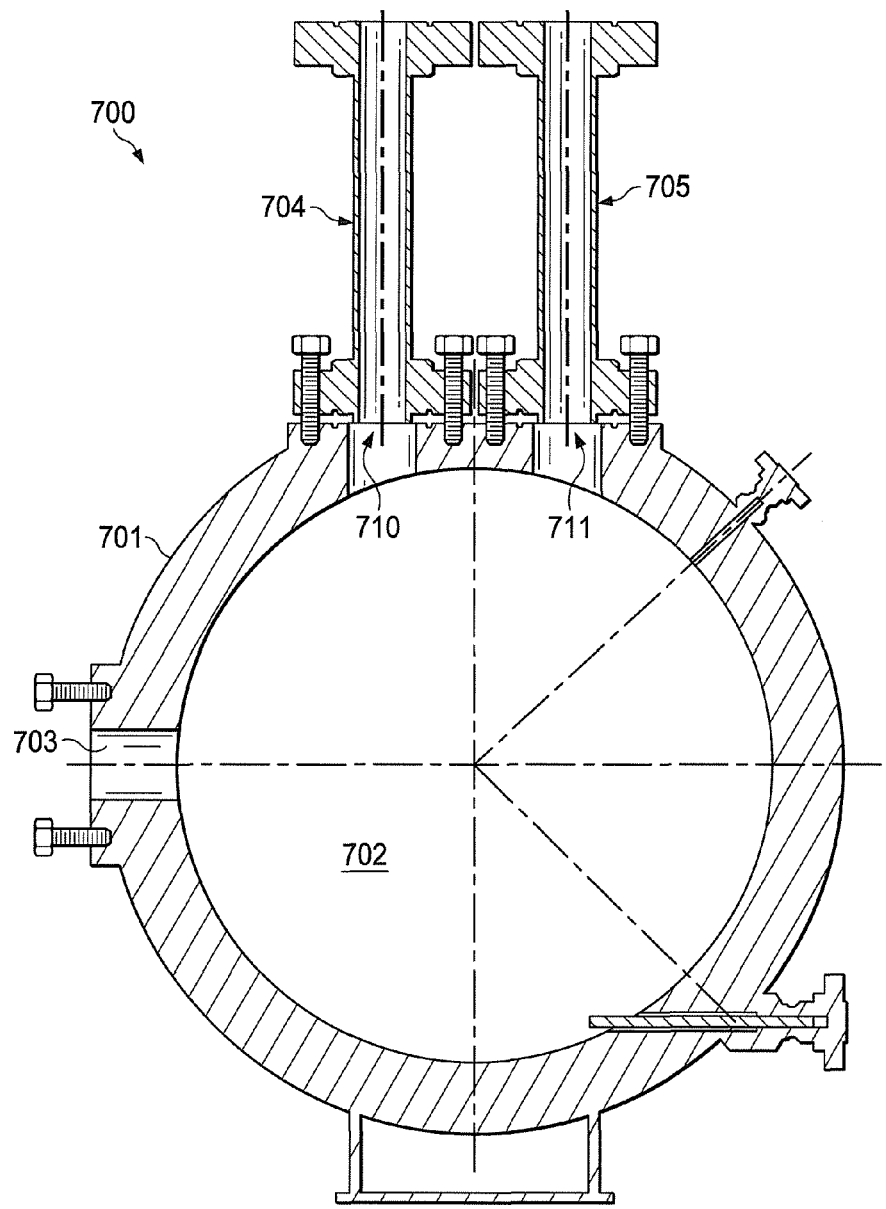
FIG. 7, FIG. 8 and FIG. 9 each illustrate an alternate embodiment to FIG. 3, FIG. 4 and FIG. 5, respectively using external pressure drop tubes rather than internal pressure drop tubes.
Figure 8:
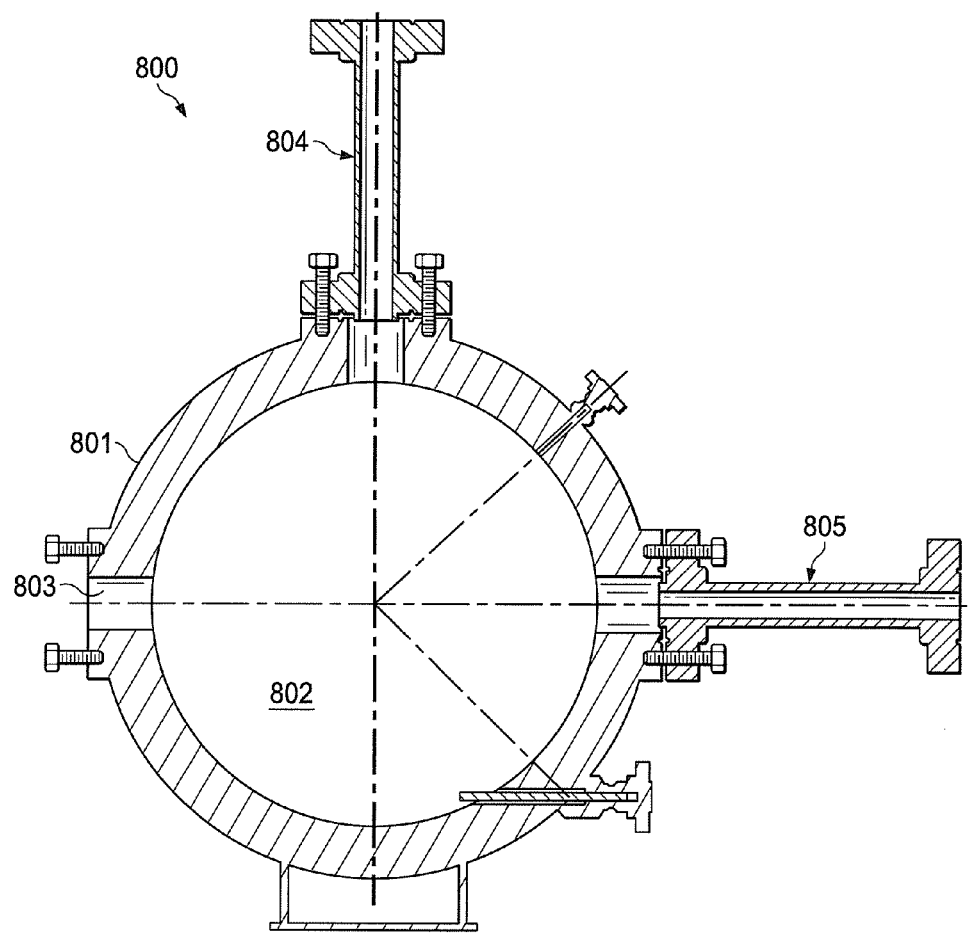
Figure 9:
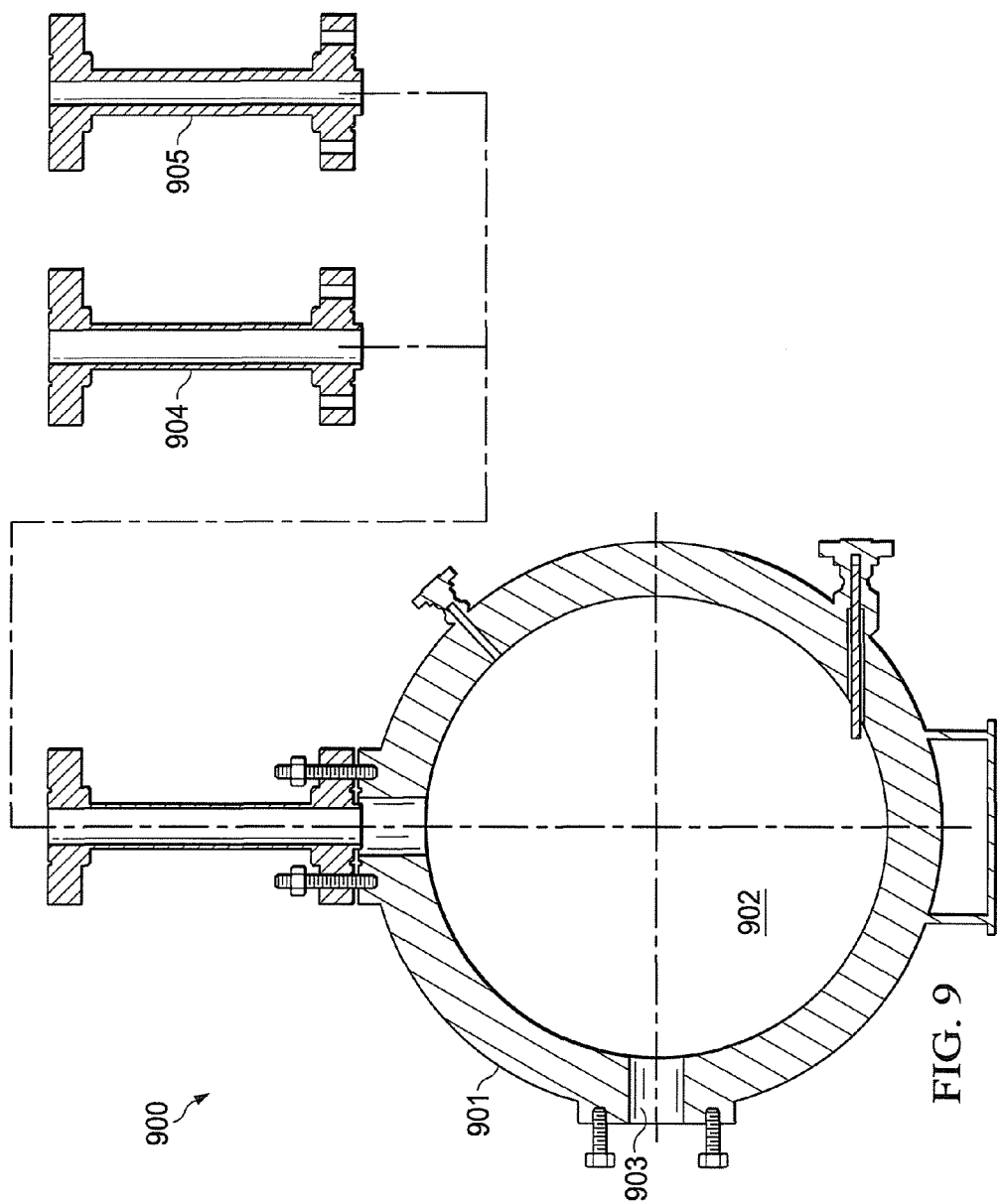

FIG. 7 illustrates an alternate embodiment to FIG. 3. In discharge dampener 700, external pressure drop tubes 704 and 705 are mounted over outlet openings 710 and 711 from the body 701. The inner diameters of pressure drop tubes 704 and 705 are different, providing different pressure pulsation dampening characteristics. The inlet of the pressure drop tube may extend inward or downward into the outlet from body 701 or even into the body 701 itself, or may alternatively be flush with the flange face of the outlet from the body 701, depending on operating requirements. Discharge piping (not shown) may be connected to the ends of external pressure drop tubes 704 and 705 remote from the body 701. FIG. 8 illustrates a similar alternative embodiment to FIG. 4, and FIG. 9 illustrates a similar alternative embodiment to FIG. 5.

Figure 10:
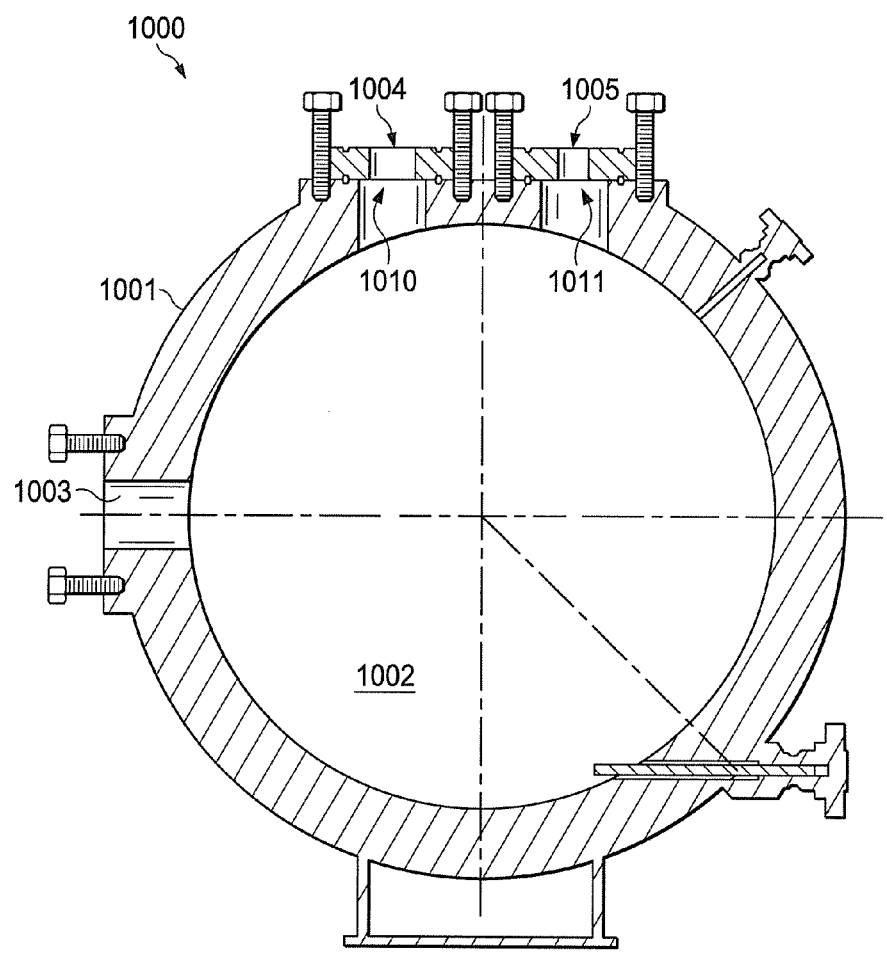
FIG. 10, FIG. 11 and FIG. 12 each illustrate an alternate embodiment to FIG. 3, FIG. 4 and FIG. 5, respectively using orifice plates rather than pressure drop tubes.
Figure 11:
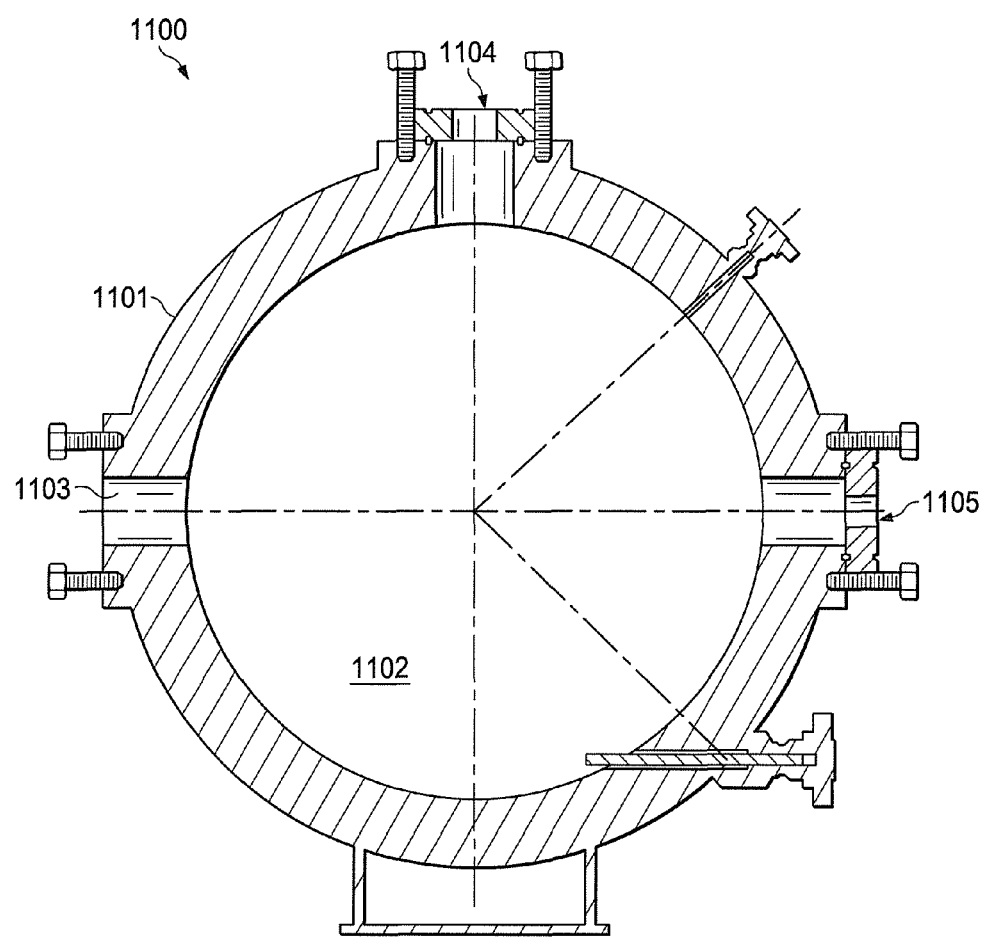
Figure 12:
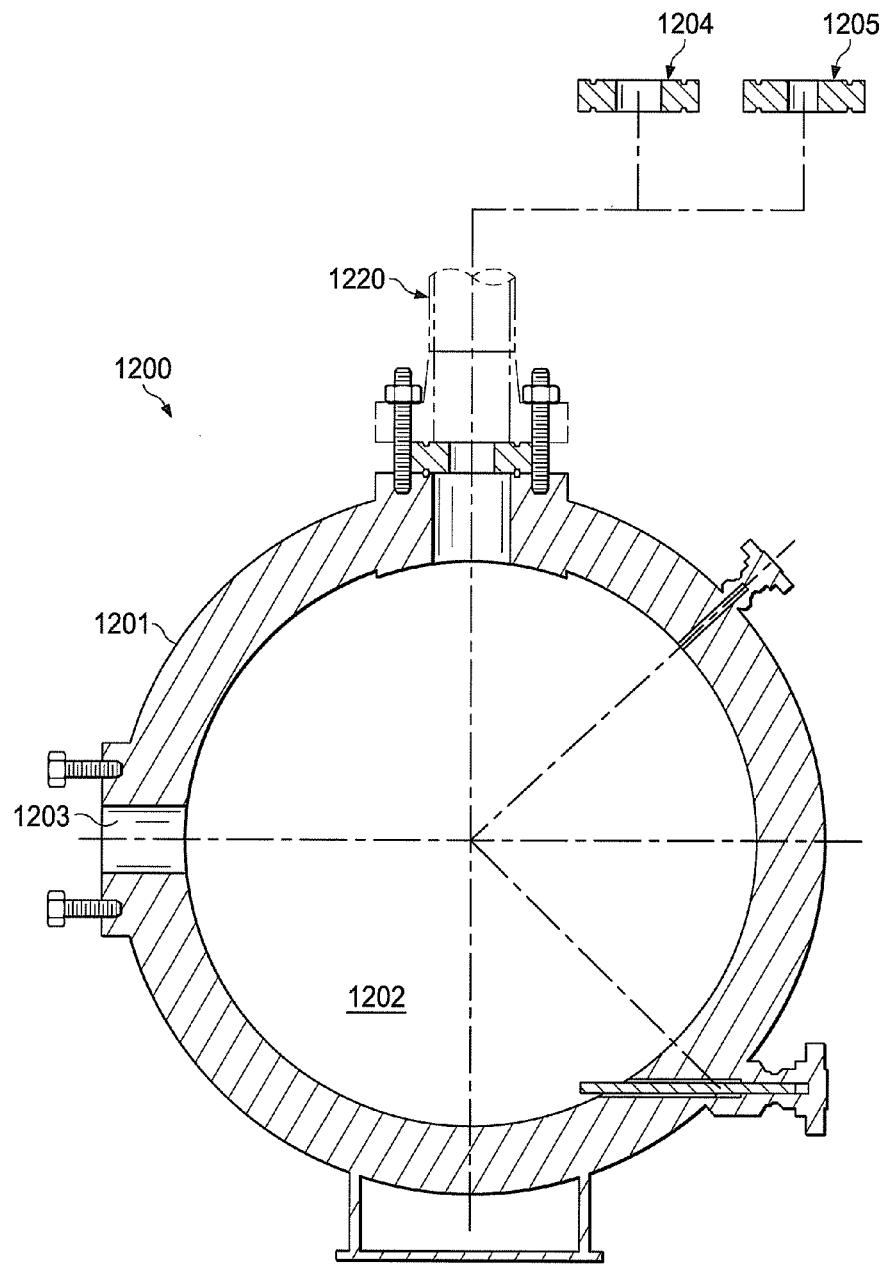

FIG. 10 illustrates another alternate embodiment to FIG. 3. Instead of internal or external pressure drop, tubes, orifice plates 1004 and 1005 having different sized openings extending through the plate (and therefore optimized for different flow rates) are mounted over outlet openings 1010 and 1011 from the body 1001. Discharge piping (not shown) may be connected over the opposite side of orifice plates 1004 and 1005 from the body 1001. FIG. 11 illustrates a similar alternative embodiment to FIG. 4, and FIG. 12 illustrates a similar alternative embodiment to FIG. 5 (with discharge piping 1220 shown).

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A discharge dampener, comprising:
an inlet to a body of the discharge dampener;
first and second outlets from the body, each in fluid communication with the inlet, wherein a selected one of the first and second outlets is open and configured to discharge fluid from an interior volume of the body while the other of the first and second outlets is closed, wherein the selected one of the first and second outlets is selected based on a flow rate of the fluid pumped through the inlet into the interior volume of the body and discharged through the selected one of the first and second outlets;
a first member connected to or inserted into the first outlet, the first member having a fluid passage with a first inner diameter sized to produce a first pressure drop in the fluid pumped into the interior volume through the inlet and discharged through the first outlet, the first pressure drop contributing more to dampening of pressure pulses in the fluid when the fluid is pumped at a first flow rate than at a second flow rate different from the first flow rate; and
a second member connected to or inserted into the second outlet, the second member having a fluid passage with a second inner diameter different than the first inner diameter sized to produce a second pressure drop different from the first pressure drop in the fluid pumped into the interior volume through the inlet and discharged from the second outlet, the second pressure drop contributing more to dampening of pressure pulses in the fluid when the fluid is pumped at the second flow rate than at the first flow rate.

2. The discharge dampener of claim 1, wherein the first member is a first outlet pipe and the second member is a second discharge pipe.

3. The discharge dampener of claim 2, wherein the first and second members are internal pressure drop tubes.

4. The discharge dampener of claim 2, wherein the first and second members are external pressure drop tubes.

5. The discharge dampener of claim 4, wherein an inlet for each of the first and second external pressure drop tubes is mounted flush to a flange face for the at least one outlet.

6. The discharge dampener of claim 4, wherein an inlet for each of the first and second external pressure drop tubes extends into the at least one outlet.

7. The discharge dampener of claim 1, wherein the first member is a first orifice plate and the second member is a second orifice plate.

8. The discharge dampener of claim 1, wherein the first and second outlets have approximately parallel alignment.

9. A discharge dampener, comprising:
an inlet to a body of the discharge dampener;
first and second outlets from the body, each in fluid communication with the inlet;
a first member connected to or inserted into the first outlet and configured to contribute to discharge dampening, the first member having a fluid passage with a first inner diameter; and
a second member connected to or inserted into the second outlet and configured to contribute to discharge dampening, the second member having a fluid passage with a second inner diameter different than the first inner diameter, wherein the first and second outlets have alignment that is at angles up to approximately perpendicular.

10. A discharge dampener, comprising:
an inlet to a body of the discharge dampener;
an outlet from the body in fluid communication with the inlet, wherein the outlet is open and configured to discharge fluid that is pumped into an interior volume of the body through the inlet;
a first member configured to be selectively connected to or inserted into the outlet, the first member having a fluid passage with a first inner diameter sized to produce a first pressure drop in the fluid pumped into the interior volume through the inlet and discharged through the outlet, the first pressure drop contributing more to dampening of pressure pulses in the fluid when the fluid is pumped at a first flow rate than at a second flow rate different from the first flow rate; and
a second member configured to be selectively connected to or inserted into the outlet, the second member having a fluid passage with a second inner diameter different than the first inner diameter and sized to produce a second pressure drop different than the first pressure drop in the fluid pumped into the interior volume through the inlet and discharged through the outlet, the second pressure drop contributing more to dampening of pressure pulses in the fluid when the fluid is pumped at the second flow rate than at the first flow rate,
wherein the outlet is sized and configured to have a selected one of the first and second members connected to or inserted into the outlet, wherein the selected one of the first and second members is selected based on a flow rate of the fluid pumped through the inlet into the interior volume of the body and discharged through the outlet.

11. The discharge dampener of claim 10, wherein the first member is a first outlet pipe and the second member is a second discharge pipe.

12. The discharge dampener of claim 11, wherein the first and second members are internal pressure drop tubes.

13. The discharge dampener of claim 11, wherein the first and second members are external pressure drop tubes.

14. The discharge dampener of claim 13, wherein an inlet for each of the first and second external pressure drop tubes is mounted flush to a flange face for the at least one outlet.

15. The discharge dampener of claim 13, wherein an inlet for each of the first and second external pressure drop tubes extends into the at least one outlet.

16. The discharge dampener of claim 11, wherein the first member is a first orifice plate and the second member is a second orifice plate.

17. A discharge dampener, comprising:
an inlet to a body of the discharge dampener;
at least one outlet from the body, the at least one outlet in fluid communication with the inlet, wherein the at least one outlet is open and configured to discharge fluid pumped into an interior volume of the body through the inlet;
at least one outlet pipe configured to be selectively connected to or inserted into the outlet, the at least one outlet pipe having a fluid passage therethrough;
a first sleeve configured to be mounted to a portion of the at least one outlet pipe and having an opening therethrough with a first inner diameter smaller than a smallest inner diameter of the fluid passage through the at least one outlet pipe and sized to produce a first pressure drop in the fluid pumped into the interior volume through the inlet and discharged through the outlet, the first pressure drop contributing more to dampening of pressure pulses in the fluid when the fluid is pumped at a first flow rate than at a second flow rate different from the first flow rate; and
a second sleeve configured to be mounted to a portion of the at least one outlet pipe and having an opening therethrough with a second inner diameter that is different than the first inner diameter and smaller than the smallest inner diameter of the fluid passage through the at least one outlet pipe and sized to produce a second pressure drop different from the first pressure drop in the fluid pumped into the interior volume through the inlet and discharged through the outlet, the second pressure drop contributing more to dampening of pressure pulses in the fluid when the fluid is pumped at the second flow rate than at the first flow rate,
wherein the at least one outlet pipe is sized and configured to have a selected one either of the first and second sleeves mounted thereto, wherein the selected one of the first and second sleeves is selected based on a flow rate of the fluid pumped through the inlet into the interior volume of the body and discharged through the outlet.

18. The discharge dampener of claim 17, wherein the at least one outlet pipe is an internal pressure drop tube and wherein the first and second sleeves are sized and configured to be mounted to an end of the internal pressure drop tube within the body.

19. The discharge dampener of claim 18, wherein the first and second sleeves are sized and configured to be mounted over the end of the internal pressure drop tube.

20. The discharge dampener of claim 18, wherein the first and second sleeves are sized and configured to be mounted within the end of the internal pressure drop tube.

* * * * *

UNITED STATES PATENT AND TRADEMARK OFFICE
CERTIFICATE OF CORRECTION

| | |
|---|---|
| PATENT NO. | : 9,249,915 B2 |
| APPLICATION NO. | : 13/355277 |
| DATED | : February 2, 2016 |
| INVENTOR(S) | : John Thomas Rogers |

It is certified that error appears in the above-identified patent and that said Letters Patent is hereby corrected as shown below:

In the Claims

Column 8, line 54, please delete "either."

Signed and Sealed this
Fourteenth Day of June, 2016

Michelle K. Lee
*Director of the United States Patent and Trademark Office*